Jan. 3, 1950     J. C. HUGHES     2,493,248
FAUCET AND VALVE THEREFOR
Filed Feb. 12, 1946
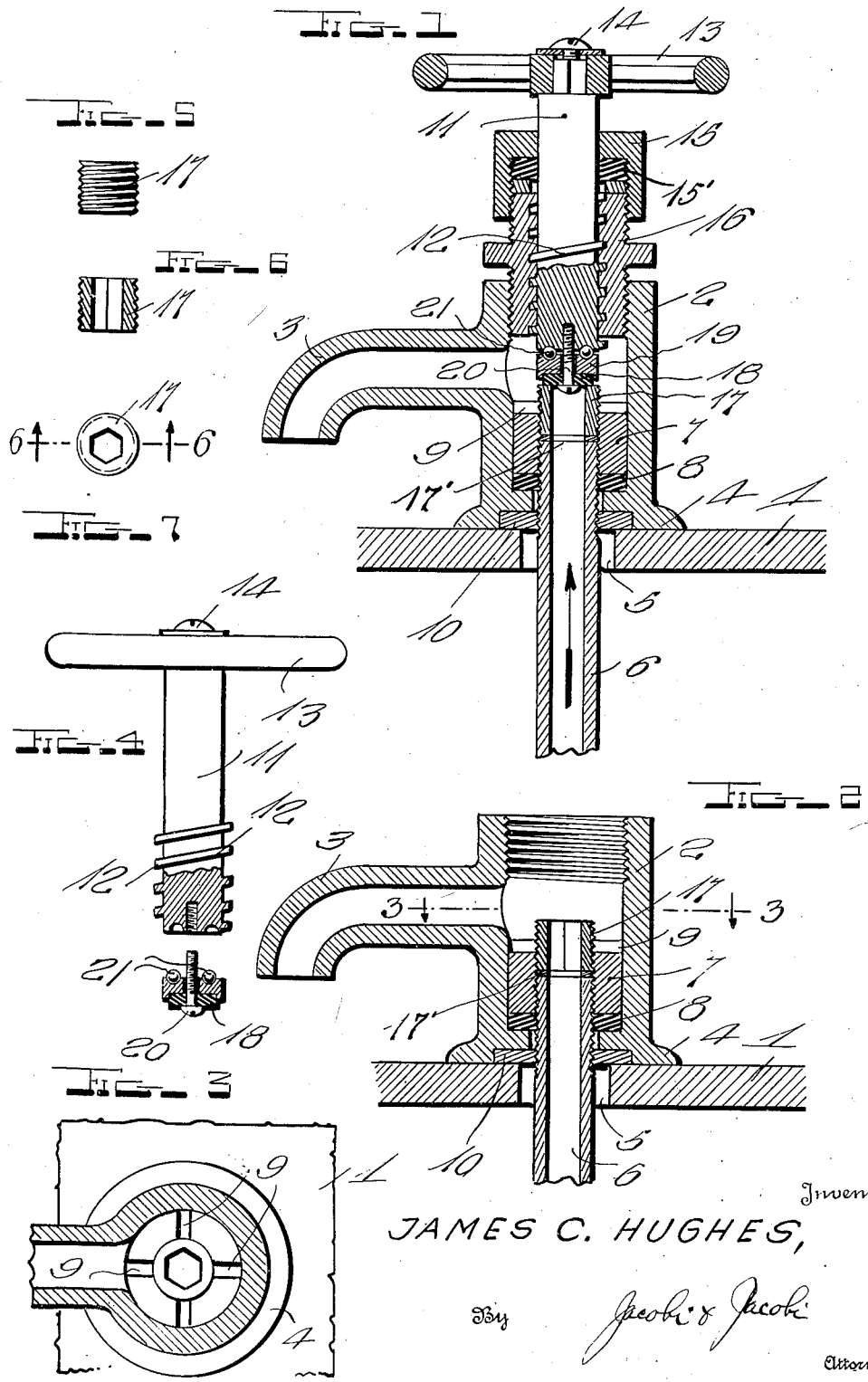
Inventor
JAMES C. HUGHES,
By Jacobi & Jacobi
Attorneys Patented Jan. 3, 1950

2,493,248

UNITED STATES PATENT OFFICE 2,493,248

FAUCET AND VALVE THEREFOR

James C. Hughes, Baltimore, Md.

Application February 12, 1946, Serial No. 647,039

2 Claims. (Cl. 251—167)

This invention relates to a faucet and valve means therefor and more particularly to a faucet which can be readily secured to the top portion of a lavatory fixture through a relatively simple connection with the water supply inlet pipe.

Water faucets in ordinary plumbing are usually provided with a portion thereof extending through the top portion of a lavatory fixture and are usually secured thereto by means of a nut or other securing member engaging that portion of the faucet extending through the lavatory fixture for securing the faucet in proper position thereon. In the present invention, the faucet is maintained in the proper position on the top portion of a lavatory through a relatively simple engagement of the body of the faucet with the customary fluid supply line which, in the present invention, is caused to extend through an opening formed in the top portion of a lavatory and engaging with the body of the faucet for securing the same to the lavatory fixture, thereby making it unnecessary to have any additional securing means engaging the body of the faucet to maintain the faucet in proper working position on the top portion of a lavatory fixture.

Another object of the invention is to so construct a faucet body in such a manner as to provide a retaining sleeve member positioned therein which will maintain a removable valve seat section within the faucet and likewise engage the supply line leading to the faucet for maintaining the faucet body in proper position on the top portion of a lavatory fixture.

Another object of the invention is to provide a practical valve stem and washer or disc therefor which will positively eliminate any wearing of the washer or disc which is usually caused by the turning movement of the valve stem as it is turned in either one direction or another to effect the admission or cut-off of flow of fluid through the faucet.

Another object of the invention is to provide a faucet and valve therefor which can be readily adapted for use with faucets of standard construction, thereby avoiding any departure from standard practice in points of operation.

Another object of the invention is to provide a faucet and valve therefor which is simple in design and construction, economical to manufacture and which will insure proper shut-off of fluid through the faucet when the disk or washer is brought to bear against the valve seat.

The means by which the foregoing and other objects are accomplished and the method of their accomplishment will readily be understood from the following specification upon reference to the accompanying drawing in which:

Figure 1 is a central vertical longitudinal section of a faucet constructed in accordance with my invention, Figure 2 is a fragmentary section of a faucet embodying my invention with some parts omitted, Figure 3 is a horizontal view taken on line 3—3 of Figure 2, Figure 4 is a detailed side elevational view showing with parts in section, the handle portion of the faucet, Figure 5 is a detailed view showing more particularly the construction of the valve seat, Figure 6 is a vertical sectional view taken on line 6—6 of Figure 7, and Figure 7 is a top plan view of the valve seat.

Referring now to the drawing in which similar numerals of reference designate parts in all the views of the drawing, numeral 1 designates a section of the top portion of a lavatory fixture and numeral 2 designates a faucet mounted thereon. Faucet 2 comprises a usual spout member 3 and an outwardly flared portion 4 that is of greater area than and overlies opening 5 formed in the top portion 1 of the lavatory. As will be readily observed from the drawing, the faucet is positioned on the top portion of the lavatory fixture and is maintained in proper position thereon in a manner more fully described hereinafter.

A water supply line comprising a tubular member 6 extends from below the lavatory and threadedly engages an internally threaded sleeve member 7 which is positioned within the body of faucet 2. A washer or gasket 8 constructed of rubber or other suitable compressible material is interposed between the retaining sleeve member 7 and the bottom wall of faucet 2 to effect a water tight connection at this portion of the faucet. A plurality of recesses 9 are formed in the top portion of retaining sleeve member 7 as clearly shown in Figures 2 and 3 of the drawing and are adapted to receive a key or other installation tool for threadedly securing the lower portion of retaining sleeve 7 to the externally threaded top portion of supply line 6. A lock nut 10 overlies opening 5 in the top portion of the lavatory fixture and threadedly engages the externally threaded portion of the supply line 6. A suitable recess is formed in the flared portion 4 of the faucet for housing the lock nut member 10 when the faucet is assembled.

The valve comprises the usual stem 11 and is externally threaded as designated by numeral 12 in the drawing. A conventional handle member 13 is secured to stem 11 by means of a screw member 14 which threadedly engages the upper portion of the aforementioned stem 11.

The upper portion of the faucet comprises an internally threaded packing nut 15 within which is positioned a compressible packing member 15'. The packing nut 15 threadedly engages the upper externally threaded portion of bonnet member 16. The lower portion of bonnet member 16 is likewise externally threaded and threadedly engages within the body member 2 of the faucet as clearly shown in Figure 1 of the drawing. It will be apparent that upon threading packing nut 15 on the upper portion of bonnet member 16 with the compressible packing member 15' interposed between the packing nut and bonnet 16 that a water tight connection will be effected at this portion of the faucet.

The valve seat comprises an externally threaded tubular member 17 which is threaded into the upper portion of retaining sleeve member 7. Interposed between the upper peripheral edge of the supply pipe 6 and the lower end of tubular seat 17, there is a washer 17' which provides a water tight connection there between. The lower portion of the valve stem 11 is provided with a washer or disc member 18 which is adapted to be brought to bear against the valve seat 17 to effect the shut-off of flow of liquid through the valve. The washer or disc member 18 comprises a circular member made of rubber or other suitable material and is of such a diameter as to completely overlie the opening extending in the valve seat 17. Interposed between the washer or disc member 18 and valve stem 11 is a centrally apertured disc member 19 which has a ball race formed in the top face thereof. The lower portion of valve stem 11 is likewise provided with a similar ball race. When the device is assembled, screw member 20 extends through the compressible washer or disc 18, disc 19 and threadedly engages the lower portion of the valve stem mid centrally thereof as clearly shown in Figures 1 and 4 of the drawing. Ball bearing members 21 are positioned within the ball race and in this manner the washer or disc 18 and disc 19 are rotatably mounted on the lower end of the valve stem 11.

In operation, the handle 13 is rotated to effect either the opening or closing of the valve. When the handle is operated to open the valve, the disc 19 and washer 18 will be lifted off the valve seat 17, thereby allowing the flow of fluid through the valve. For closing the valve, the handle is likewise rotated and the washer or disc member 18 is brought to bear against the valve seat 17. When the washer or disc is firmly seated on valve seat 17, further rotation of the washer or disc 18 will be prevented by reason of the ball bearing connection between the stem 11 and the washer or disc 18. Further rotation of the stem member 11 will cause the washer or disc member 18 to seat itself firmly upon the valve seat 17 without further rotation thereof which will, obviously eliminate wear of the washer or disc member 18 which are common in ordinary faucets where the valve washer or disc rotates against its valve seat in order to effect a seal thereon.

Thus it will be seen that I have provided a faucet and valve means therefor which will not only be very effective in insuring a proper shut-off of flow of fluid through the valve but which can be readily assembled and removed from the top portion of a lavatory without the necessity of first disconnecting the faucet from the under side of the lavatory as is common in ordinary faucets. Having described one embodiment of the invention in detail, it is obvious that various modifications and alterations can be made without departing from the spirit or scope of the invention defined in the appended claims.

I claim:

1. A faucet comprising a body formed with a well open at its top and having a bottom spaced upwardly from the lower end of the body and providing a recess under the well at the bottom of the body, a spout extending from said body, the bottom being formed with an opening communicating with the well and the recess whereby an externally threaded supply pipe may to be passed upwardly through the recess and the bottom into the well, a compressible gasket in the well resting upon the bottom, a sleeve in said well rotatable therein and formed with a threaded vertically extending bore for receiving an upper portion of the supply pipe, a nut in the recess for threaded engagement with the supply pipe, a tubular valve seat screwed into said sleeve through the upper end thereof and projecting upwardly from the sleeve, and a sealing gasket in the sleeve for forming a tight joint between the lower end of the valve seat and the upper end of said pipe.

2. A faucet comprising a body formed with a vertical well open at its top and having a bottom formed with an opening for receiving an externally threaded pipe, there being an outlet leading from the well, a nut under the body for threaded engagement with the pipe, a compressible gasket at the bottom of the well, a sleeve having a threaded bore for receiving the pipe and being of a depth adapting it to project upwardly from the pipe when screwed downwardly thereon into compressing engagement with the gasket, and a tubular valve seat screwed into the upper portion of said sleeve and projecting upwardly from the sleeve.

JAMES C. HUGHES.

REFERENCES CITED

The following references are of record in the file of this patent:

UNITED STATES PATENTS

| Number | Name | Date |
| --- | --- | --- |
| 926,885 | Lippold | July 6, 1909 |
| 1,326,430 | Walsh | Dec. 30, 1919 |
| 1,865,824 | Bradford | July 5, 1932 |